United States Patent Office 2,945,847
Patented July 19, 1960

2,945,847

SALT COMPLEXES OF 3:3'-UREIDO-BIS-[8-(3-BENZ-AMIDO-p-TOLUIDO)-1:3:5-NAPHTHALENE SULPHONIC ACID]

James Williamson, Plateau Province, Northern Nigeria, assignor to National Research Development Corporation, London, England, a corporation of Great Britain No Drawing. Filed May 1, 1958, Ser. No. 732,136

Claims priority, application Great Britain Mar. 27, 1956

14 Claims. (Cl. 260—96.5)

This invention relates to parasiticidal drugs. This application is a continuation-in-part of my prior copending applications Serial Nos. 646,564 and 675,571, filed March 18 and August 1, 1957, respectively, both of which are now abandoned.

It is an object of the present invention to provide improved drugs suitable for the treatment of trypanosomiasis in animals such as cattle, pigs and horses.

The present invention provides parasiticidal drugs which are complexes of low solubility in water of (a) water-soluble salts, such as the hexa-sodium salt, of 3:3' - ureido - bis - [8 - (3-benzamido - p - toluido)-1:3:5-naphthalene sulphonic acid] (hereinafter called "Suramin"), and any one of water-soluble salts of basic trypanocidal drugs which are selected from the class consisting of (b) 4-amino-6-(2'-amino-1':6'-dimethyl-pyrimidyl-4'-amino)-quinaldine (hereinafter called "Antrycide"), the salts being for example the 1:1'-dimethyl sulphate, -dimethanesulphonate, -dichloride, -dibromide, or -diiodide.

(b') 2:7 - diamino - 9 - phenyl - 10 - ethylphenanthridine (hereinafter called "Ethidium"), the salts being for example the chloride, bromide, iodide, methanesulphonate, or methylsulphate.

(b'') 2-amino-7-(2'-amino-1':6'-dimethylpyrimidyl-4'-amino)-9-p-aminophenyl-10-methylphenanthridine, i.e. a compound which in salt form has the general formula:

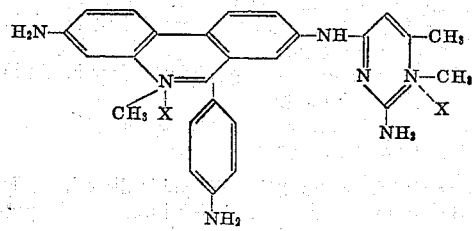

where X is an anion, such as chloride, bromide, iodide, methane sulphonate or methylsulphate, e.g. 2-amino-7-(2'-amino - 1':6' - dimethylpyrimidyl - 4' - amino) - 9 - p-aminophenyl - 10 - methyl - phenanthridinium dibromide (hereinafter called "RD 2801"), and (b''') 2-amino-7-(2'-amino-1':6'-dimethylpyrimidyl-4'-amino)-9-phenyl-10-ethylphenanthridine, i.e. a compound which in salt form has the general formula:

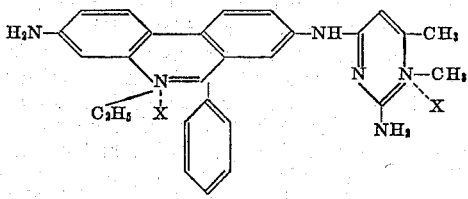

where X is an anion such as a chloride, bromide, iodide, methanesulphonate or methylsulphate, e.g. 2-amino-7-(2'-amino - 1':6' - dimethylpyrimidyl - 4' - amino) - 9-phenyl - 10 - ethyl - phenanthridinium dimethanesulphonate (hereinafter called "RD 2902").

The complexes of the present invention were originally thought to be formed by salt linkages between the sulphonic acid groups of Suramin and the ionised cationic centre or centres of the basic trypanocidal drug. Further research and investigation, however, have shown that they probably are in fact complexes which contain the anion constituent of Suramin and the cation constituent of the basic trypanocidal drug linked together in such fashion as might result from a simple metathesis such as might be visualized as follows:

$$Na^+X + YCl \rightarrow XY + NaCl$$

where the first reactant is the Suramin in the form of (say) its sodium salt and the second reactant is the basic trypanocidal drug in the form of (say) its chloride. Nevertheless, it is to be distinctly understood that I do not wish to be bound by or to any particular theory or modus operandi, since the practical beneficial results of my invention are fully manifested irrespectively of the correctness or otherwise of any explanation that may be advanced in support thereof.

These complexes are soluble in excess Suramin but not in excess basic trypanocidal drug. The salts that are employed are of course those that are therapeutically acceptable.

Gravimetric analyses of complexes formed by complete precipitation in neutral solution of a known quantity of Suramin with excess basic trypanocide have given molar ratios approximating 1:3 for the bis-quaternary drugs such as Antrycide dimethylsulphate, and to 1:6 for mono-quaternary drugs such as Ethidium bromide. This originally suggested that one molecule of Suramin with six sulphonic acid groups takes up maximally three molecules of drugs such as Antrycide with two cationic centres, and six molecules of drugs such as Ethidium with one cationic centre, but these facts are also consistent with the metathetical theory of formation set forth above.

At all events, it is clear that the precipitated complexes are not simple mixtures; they do not melt at temperatures up to 250° C. (i.e. higher than the melting points of constituents such as Ethidium bromide), and it seems probable that Suramin, which like Congo red, can form micellar aggregates, is precipitated by strongly basic trypanocides capable of forming salt linkages with it. The complexes in aqueous suspension appear to be stable for periods of at least several months at room temperature and in the cold. At temperatures of 70°–80° C. aqueous suspensions of the Antrycide and Ethidium complexes coagulate irreversibly to a wax-like consistency hardening on cooling. This may be due to loss of micellar hydration as the temperature is raised.

The complexes of the present invention may be prepared by adding an aqueous solution of a water-soluble salt of 3:3'-ureido-bis-[8-(3-benzamido-p-toluido)-1:3:5-naphthalene sulphonic acid] to an aqueous solution of a water-soluble salt of Antrycide, Ethidium, 2-amino-7-(2'-amino - 1':6' - dimethyl - pyrimidyl - 4' - amino) - 9 - p-aminophenyl-10-methylphenanthridine or 2-amino-7-(2'-amino - 1':6' - dimethylpyrimidyl - 4' - amino) - 9-phenyl-10-ethylphenanthridine.

Preferably the salts employed are those with monovalent cations and anions.

The product may be subjected to freeze-drying.

This gives a fine powder which on reconstitution with water gives a suspension which has the same particle size as the freshly prepared complex.

The conventional freeze-drying technique may be employed, for example using a standard Edwards machine as used for the commercial preparation of vaccines.

The following example including a freeze-drying step illustrates the invention:

*Example 1*

A Suramin-Ethidium bromide complex consisting of a total weight of 9.48 g. of the two constituents in approximately 90 ml. water was freeze-dried in an Edwards machine for approximately 48 hours at −47° C., 0.18 mm. Hg pressure. The resulting dry powder was reconstituted to give a dose level equivalent to 5 mg./kg. Ethidium bromide at two dose volumes, (i) 1 ml./20 kg. and (ii) 1 ml./53.4 kg. The high drug concentration in (ii) was made possible by the reduced viscosity of the reconstituted freeze-dried material as compared with the original material as freshly precipitated. The considerable reduction in dose volume thus made possible is a distinct advantage from the point of view of practical drug administration.

The reconstituted preparations (i) and (ii) above have been well tolerated by the intramuscular route in cattle over an observation period of approximately one month.

The concentrations required to ensure maximal mutual precipitations are calculated on the basis of the molecular combining proportions described above, i.e. molecular ratios (Suramin/basic trypanocidal drug) of 1:6 for Ethidium bromide, and of 1:3 for Antrycide dimethylsulphate, RD 2801 and RD 2902. On a weight basis, the ratios become 1:1.66 for Ethidium bromide, 1:1.12 for Antrycide dimethylsulphate, 1:1.32 for RD 2902 (as dimethane sulphonate) and 1:1.25 for RD 2801. (Ethidium bromide, RD 2902 and RD 2801, are in fact monohydrates but the ratios refer to the anhydrous salt.)

From the determinations of maximum tolerated doses of these complexes in small animals, appropriate doses were worked out for cattle, adjustments being made where required for individual drug solubilities so as to ensure minimal total injection volume.

It will be understood, however, that the complexes can also be used in the treatment of animals other than cattle such as pigs and horses.

The main advantages of the complexes of the present invention are:

(a) Increased duration of trypanocidal effect, i.e. the conferment of prophylactic properties by complex formation on drugs which given alone do not possess them;

(b) Reduction of toxicity (for example, by factors varying from 3 to 14 fold); this in itself is of considerable practical advantage, as it should enable drug-resistant strains to be treated and probably eradicated with much larger doses of complex than can be safely given as either of the constituents of the complex alone. This is reinforced by a third advantage;

(c) The therapeutic or curative activity of the basic drug does not appear to be markedly reduced by complex formation.

The improved properties (increased prophylaxis and decreased toxicity) can be ascribed to decreased solubility, as the complex is retained for long periods in and around the subcutaneous tissues at the site of the injection, in some cases becoming encapsulated. This also occurs with Antrycide chloride, but this substance, unlike the active complexes of the present invention, has relatively little therapeutic or curative activity, and it would appear that not only do the active complexes disassociate more slowly than Antrycide chloride but they are able to maintain a higher level of trypanocidal activity in the blood.

The effect of the drugs combined in the complexes of the present invention is not simply additive. As far as prophylaxis in small animals is concerned, the effect of the Suramin-Antrycide dimethylsulphate complex, for example, is greater than the sum of the effects of the individual constituents given separately.

The increased prophylaxis is therefore probably enhanced by synergistic therapeusis in addition to decreased solubility, as Suramin, although less active against trypanosomes of the *T. congolense* and *T. vivax* type which occur in cattle, than against trypanosomes of the *T. brucei* group (which includes those causing sleeping sickness in man), doubtless contributes to the overall trypanocidal activity of the complex.

The complexes of the present invention have been tested against *T. vivax* in cattle.

Throughout the trials the challenge was administered by laboratory reared *G. palpalis*, whose infection rate had been raised to 90–100 percent by multiple feeds on animals heavily with *T. vivax*. Batches of 100 to 150 such infected flies were fed for 3 consecutive days on each experimental ox, and this three-day challenge was repeated every 10 to 14 days until breakthrough occurred. The challenge was mainly from *T. vivax*, but periodically batches of wild *G. longipalpis* were imported from Southern Nigeria; such flies had an overall infection rate of 21 percent, of which 17 percent was *vivax* group and 4 percent *congolense* group. The *T. congolense* infections were not entirely absent from the challenge was shown by the fact that two animals broke through to this species of trypanosome.

Irrespective of how such a challenge compares with a field challenge, it is important to note that all animals used in the experiment were subjected to the same challenge, and hence the prophylactic activity exhibited by the different drugs used is comparable, although the duration of the prophylactic period in the field may later be found to be greater or less than the figures given herein.

The following results were obtained.

1. The Ethidium bromide-Suramin complex:
   At 5 mg./kg. with 2 beasts, the breakthrough did not occur until the 7th month.
   At 10 mg./kg., with 3 beasts, one broke through after 13 months, and the remaining two are still protected after 18 months.

2. The RD 2902-Suramin complex:
   At 10 mg./kg., with 3 beasts, all still protected after 7 months.
   At 20 mg./kg., with 2 beasts, all still protected after 6 months.

3. The RD 2801-Suramin complex:
   At 2 mg./kg., among 4 beasts, first breakthrough after 2 months,
   At 5 mg./kg., among 3 beasts, first breakthrough after 4½ months,
   At 10 mg./kg., among 3 beasts, still protected after 7 months.

It was also found that the Antrycide dimethyl sulphate-Suramin complex, cures *T. simiae* infections in pigs and may protect them against such infections for 5 to 6 months.

The complexes made from Ethidium chloride are particularly advantageous because it is then possible to obtain a low dose volume.

Thus, the most concentrated Ethidium-Suramin complex preparation which can be conveniently made with Ethidium bromide has an Ethidium bromide content of 5 percent (w./v.), giving a dose volume of 1 ml./5 kg. for a dose level of 10 mg./kg. This concentration was doubled by using the more soluble Ethidium chloride at the same optimal molecular combining proportion and making the necessary adjustment in the molecular weight from the bromide to the chloride salt (i.e., 1.000 gm. of Ethidium bromide is equivalent to 0.892 gm. of Ethidium chloride). The resulting preparation had an Ethidium chloride content equivalent to 10 percent (w./v.) of Ethidium bromide, giving a dose volume of 1 ml./10 kg. for a dose level of 10 mg./kg.

Further experiments showed that aqueous Ethidium chloride solutions of up to 40 percent (w./v.) concentration were stable for at least 48 hours at temperatures of 25–28° C. Following these observations, I have now been able to produce an Ethidium-Suramin complex with an Ethidium chloride content equivalent to 25 percent (w./v.) Ethidium bromide giving a dose volume of 1 ml./25 kg. at the 10 mg./kg. dose level, and this preparation has been administered to cattle.

The following example illustrates this phase of the invention:

Example 2

An amount of Ethidium chloride alcoholate containing 84.8% by weight of Ethidium chloride equivalent to 25 gms. of Ethidium bromide was dissolved in water with heating and made up to 64 ml. The amount of Suramin (of known moisture content) equivalent to the amount of anhydrous Suramin necessary for maximal complex preparation (i.e. 14.26 gm.) was dissolved in water with heating and made up to 30 ml. The cooled solutions were mixed by addition of the Suramin solution to the Ethidium solution with rapid mechanical stirring, and the complex separated out as a stiff paste. 6 ml. of glycerol was added to prevent the rapid desiccation of the wet complex which takes place in tropical climates. Preliminary experiments showed that concentrations of glycerol alone of up to 12% in water have no harmful effect on injection into cattle.

The preparation was just sufficiently mobile to be injectable with the type of syringe and needle normally employed for cattle treatment.

What I claim is:

1. A complex of low solubility in water of (a) a water-soluble salt of 3:3'-ureido-bis-[8-(3-benzamide-p-toluido)-1:3:5-naphthalene sulphonic acid] and a water-soluble salt of a basic trypanocidal drug selected from the group consisting of (b) 4-amino-6-(2'-amino-1':6'-dimethylpyrimidyl - 4' - amino)-quinaldine, (b') 2:7-diamino-9-phenyl-10-ethylphenanthridine, (b") 2-amino-7-(2' - amino-1':6'-dimethylpyrimidyl-4'-amino)-9-p-aminophenyl-10-methylphenanthridine, and (b''') 2-amino-7-(2' - amino-1':6'-dimethylpyrimidyl-4'-amino)-9-phenyl-10-ethylphenanthridine, the ratio of the reactants being such that for each molecule of the first reactant the product of the number of molecules of the second reactant and the number of cationic centers therein is six.

2. A complex of low solubility in water of a water-soluble salt of 3:3'-ureido-bis-[8-(3-benzamide-p-toluido)-1:3:5-naphthalene sulphonic acid] and 2:7-diamino-9-phenyl-10-ethylphenanthridine bromide, the ratio of the reactants being such that for each molecule of the first reactant the product of the number of molecules of the second reactant and the number of cationic centers therein is six.

3. A complex of low solubility in water of a water-soluble salt of 3:3'-ureido-bis-[8-(3-benzamide-p-toluido)-1:3:5-naphthalene sulphonic acid] and 2:7-diamino-9-phenyl-10-ethylphenanthridine chloride, the ratio of the reactants being such that for each molecule of the first reactant and product of the number of molecules of the second reactant and the number of cationic centers therein is six.

4. A complex of low solubility in water of a water-soluble salt of 3:3'-ureido-bis-[8-(3-benzamide-p-toluido)-1:3:5-naphthalene sulphonic acid] and 2-amino-7-(2' - amino - 1':6' - dimethyl-pyrimidyl-4'-amino)-9-p-aminophenyl - 10-methylphenanthridine dibromide, the ratio of the reactants being such that for each molecule of the first reactant the product of the number of molecules of the second reactant and the number of cationic centers therein is six.

5. A complex of low solubility in water of a water-soluble salt of 3:3'-ureido-bis-[8-(3-benzamide-p-toluido)-1:3:5-naphthalene sulphonic acid] and 2-amino-7-(2'-amino - 1':6' - dimethylpyrimidyl-4'-amino)-9-phenyl-10-ethylphenanthridine dimethanesulphonate, the ratio of the reactants being such that for each molecule of the first reactant the product of the number of molecules of the second reactant and the number of cationic centers therein is six.

6. A salt complex of low solubility in water of (a) the hexa-sodium salt of 3:3'-ureido-bis-[8-(3-benzamido-p-toluido)-1:3:5-naphthalene sulphonic acid] and a water-soluble salt of a basic trypanocidal drug selected from the group consisting of (b) 4-amino-6-(2'-amino-1':6'-dimethylpyrimidyl - 4' - amino)-quinaldine, (b') 2:7-diamino-9-phenyl-10-ethylphenanthridine, (b") 2-amino-7-(2' - amino-1':6'-dimethylpyrimidyl-4'-amino)-9-p-aminophenyl-10-methylphenanthridine, and (b''') 2-amino-7-(2' - amino-1':6'-dimethylpyrimidyl-4'-amino)-9-phenyl-10-ethylphenanthridine, the ratio of the reactants being such that for each molecule of the first reactant the product of the number of molecules of the second reactant and the number of cationic centers therein is six.

7. A salt complex of low solubility in water of the hexa-sodium salt of 3:3'-ureido-bis-[8-(3-benzamido-p-toluido)-1:3:5-naphthalene sulphonic acid] and 2:7-diamino - 9 - phenyl-10-ethylphenanthridine bromide, the ratio of the reactants being such that for each molecule of the first reactant the product of the number of molecules of the second reactant and the number of cationic centers therein is six.

8. A salt complex of low solubility in water of the hexa-sodium salt of 3:3'-ureido-bis-[8-(3-benzamido-p-toluido)1:3:5-naphthalene sulphonic acid] and 2:7-diamino-9-phenyl-10-ethylphenanthridine chloride, the ratio of the reactants being such that for each molecule of the first reactant the product of the number of molecules of the second reactant and the number of cationic centers therein is six.

9. A salt complex of low solubility in water of the hexa-sodium salt of 3:3'-ureido-bis-[8-(3-benzamido-p-toluido)-1:3:5-naphthalene sulphonic acid] and 2-amino-7-(2' - amino - 1':6'-dimethyl-pyrimidyl-4'-amino)-9-p-aminophenyl - 10 - methylphenanthridine dibromide, the ratio of the reactants being such that for each molecule of the first reactant the product of the number of molecules of the second reactant and the number of cationic centers therein is six.

10. A salt complex of low solubility in water of the hexa-sodium salt of 3:3'-ureido-bis-[8-(3-benzamido-p-toluido)-1:3:5-naphthalene sulphonic acid] and 2-amino-7-(2'-amino-1':6'-dimethylpyrimidyl-4'-amino)-9-phenyl-10-ethylphenanthridine dimethanesulphonate, the ratio of the reactants being such that for each molecule of the first reactant the product of the number of molecules of the second reactant and the number of cationic centers therein is six.

11. A process for the preparation of a complex of low solubility in water which comprises reacting an aqueous solution of a salt of 3:3'-ureido-bis-[8-(3-benzamido-p-toluido)-1:3:5-naphthalene sulphonic acid] with an aqueous solution of a salt of a basic trypanocidal drug selected from the group consisting of (b) 4-amino-6-(2'-amino - 1':6' - dimethylpyrimidyl-4'-amino)-quinaldine, (b') 2:7-diamino-9-phenyl-10-ethylphenanthridine, (b") 2 - amino-7-(2'-amino-1':6'-dimethylpyrimidyl-4'-amino) - 9 - p - aminophenyl-10-methylphenanthridine, and (b''') 2-amino-7-(2'-amino - 1':6' - dimethylpyrimidyl-4'-amino)-9-phenyl-10-ethylphenanthridine, the ratio of the reactants being such that for each molecule of the first reactant the product of the number of molecules of the second reactant and the number of cationic centers therein is six.

12. A process as claimed in claim 11 wherein the product obtained is subjected to freeze-drying.

13. A process for the preparation of a salt complex of low solubility in water which comprises reacting an aqueous solution of the hexa-sodium salt of 3:3'-ureido-bis - [8 - (3 - benzamido-p-toluido)-1:3:5-naphthalene sulphonic acid] with an aqueous solution of a salt of a basic trypanocidal drug selected from the group consisting of (b) 4 - amino - 6-(2'-amino-1':6'-dimethylpyrimidyl-4'-amino)-quinaldine, (b') 2:7-diamino-9-phenyl-10-ethylphenanthridine, (b'') 2-amino-7-(2'-amino-1':6'-dimethylpyrimidyl - 4' - amino) - 9 - p-aminophenyl-10-methylphenanthridine, and (b''') 2-amino-7-(2'-amino-1':6' - dimethylpyrimidyl - 4'-amino)-9-phenyl-10-ethylphenanthridine, the ratio of the reactants being such that for each molecule of the first reactant the product of the number of molecules of the second reactant and the number of cationic centers therein is six.

14. A process as claimed in claim 13 wherein the product obtained is subjected to freeze-drying.

References Cited in the file of this patent

UNITED STATES PATENTS 2,589,210     McGinty _____ Nov. 18, 1952

FOREIGN PATENTS 536,293     Great Britain _____ May 9, 1941

OTHER REFERENCES

Williamson et al.: Nature, vol. 177, pp. 1074–1075 (1956).